US009078290B2

(12) United States Patent
Lai

(10) Patent No.: US 9,078,290 B2
(45) Date of Patent: Jul. 7, 2015

(54) UPLINK TRANSMISSION METHOD, DOWNLINK TRANSMISSION METHOD, AND CONVERGENCE DEVICE

(75) Inventor: Zhichang Lai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1750 days.

(21) Appl. No.: 12/467,096

(22) Filed: May 15, 2009

(65) Prior Publication Data
US 2009/0225702 A1 Sep. 10, 2009

Related U.S. Application Data

(63) Continuation of application No. PCT/CN2008/071126, filed on May 28, 2008.

(30) Foreign Application Priority Data

Jun. 12, 2007 (CN) .......................... 2007 1 0126146

(51) Int. Cl.
*H04W 92/12* (2009.01)
*H04L 29/06* (2006.01)

(52) U.S. Cl.
CPC ............... *H04W 92/12* (2013.01); *H04L 69/04* (2013.01); *H04L 69/16* (2013.01); *H04L 69/22* (2013.01); *H04L 69/164* (2013.01)

(58) Field of Classification Search
None
See application file for complete search history.

(56) References Cited

U.S. PATENT DOCUMENTS

| 6,112,076 A * | 8/2000 | Goetz et al. ................... 455/406 |
| 6,704,311 B1 * | 3/2004 | Chuah et al. .................. 370/389 |
| 6,714,784 B1 * | 3/2004 | Forssell et al. ................ 455/436 |
| 6,721,333 B1 * | 4/2004 | Milton et al. .................. 370/469 |
| 6,993,021 B1 * | 1/2006 | Chuah et al. .................. 370/389 |
| 7,283,502 B1 * | 10/2007 | Abraham et al. .............. 370/337 |
| 7,346,029 B2 * | 3/2008 | Lee ................................ 370/329 |
| 7,382,746 B2 * | 6/2008 | Abe et al. ...................... 370/329 |
| 7,539,212 B2 * | 5/2009 | Kekki et al. ................... 370/469 |
| 7,558,240 B2 * | 7/2009 | Chen et al. .................... 370/338 |

(Continued)

FOREIGN PATENT DOCUMENTS

| CN | 1531259 | 9/2004 |
| CN | 1866969 A | 11/2006 |

(Continued)

OTHER PUBLICATIONS

Written Opinion of the International Searching Authority mailed Sep. 4, 2008 issued in corresponding International Patent Application No. PCT/CN2008/071126.

(Continued)

*Primary Examiner* — Hassan Kizou
*Assistant Examiner* — Roberta A Shand
(74) *Attorney, Agent, or Firm* — Staas & Halsey LLP

(57) ABSTRACT

The present invention relates to the communication field, and discloses an uplink transmission method, a downlink transmission method, and a convergence device. The convergence device selects user plane UDP packets compliant with a multiplexing condition among the user plane UDP packets that come from at least one Node B, multiplexes the selected user plane UDP packets, and sends the packets to a RNC. The multiplexed UDP packet received from the RNC is demultiplexed into at least two user plane UDP packets which are sent to corresponding Node Bs or a corresponding Node B respectively.

19 Claims, 9 Drawing Sheets

(56) References Cited

U.S. PATENT DOCUMENTS

| | | | |
|---|---|---|---|
| 7,596,084 B2 * | 9/2009 | Liu et al. | 370/229 |
| 7,684,435 B2 * | 3/2010 | Kim et al. | 370/466 |
| 7,701,922 B2 * | 4/2010 | Terry | 370/349 |
| 7,839,846 B2 * | 11/2010 | Ko | 370/389 |
| 2001/0025321 A1 | 9/2001 | Tang et al. | |
| 2002/0012328 A1 * | 1/2002 | Emanuel et al. | 370/328 |
| 2003/0147371 A1 * | 8/2003 | Choi et al. | 370/341 |
| 2004/0010609 A1 * | 1/2004 | Vilander et al. | 709/230 |
| 2004/0068571 A1 * | 4/2004 | Ahmavaara | 709/228 |
| 2005/0101351 A1 * | 5/2005 | Lee et al. | 455/558 |
| 2005/0259690 A1 * | 11/2005 | Garudadri et al. | 370/477 |
| 2006/0268821 A1 * | 11/2006 | Terry | 370/349 |
| 2008/0228936 A1 * | 9/2008 | Schmid et al. | 709/232 |
| 2009/0219939 A1 * | 9/2009 | Isosaari | 370/400 |

FOREIGN PATENT DOCUMENTS

| | | |
|---|---|---|
| CN | 1889575 | 1/2007 |
| CN | 1909513 A | 2/2007 |
| CN | 1960340 A | 5/2007 |
| CN | 101068216 | 11/2007 |
| CN | 100574283 C | 12/2009 |
| EP | 1239686 A1 | 9/2002 |
| KR | 20040001255 | 1/2004 |

OTHER PUBLICATIONS

Chinese Office Action dated Feb. 20, 2009 issued in corresponding Chinese Patent Application No. 200710126146.0.

* cited by examiner

| Bit stream | | | | | | | | Quantity of bytes | Description | |
|---|---|---|---|---|---|---|---|---|---|---|
| 7 | 6 | 5 | 4 | 3 | 2 | 1 | 0 | | | User service flow |
| Source IP, destination IP ||||||||  20/40 | IP header (IPv4, IPv6) | |
| Source UDP port, destination UDP port (user-defined) |||||||| 8 | UDP header | |
| Node B Identifier (NID) |||||||| 1 | FPmux header | #1 |
| User Identifier (UID) |||||||| 2 | | |
| Length field |||||||| 1~2 | | |
| FP PDU |||||||| 1~$n_1$ | FP PDU in the payload of the user plane UDP packet involved in multiplexing | |
| FPmux header |||||||| 4~5 | FPmux header | #2 |
| FP PDU |||||||| 1~$n_2$ | FP PDU in the payload of the user plane UDP packet involved in multiplexing | |
| ...... |||||||| ...... | ...... | ...... |
| FPmux header |||||||| 4~5 | FPmux header | #m |
| FP PDU |||||||| 1~$n_m$ | FP PDU in the payload of the user plane UDP packet involved in multiplexing | |

User Identifier (UID)

Figure 6

UPLINK TRANSMISSION METHOD, DOWNLINK TRANSMISSION METHOD, AND CONVERGENCE DEVICE

CROSS-REFERENCE TO RELATED APPLICATIONS

This application is a continuation of International Application No. PCT/CN2008/071126, filed on May 28, 2008, which claims the benefit of Chinese Patent Application No. 200710126146.0, filed on Jun. 12, 2007, both of which are hereby incorporated by reference in their entireties.

FIELD OF THE INVENTION

The present invention relates to the communication field, and in particular, to an uplink transmission method, a downlink transmission method, and a relevant convergence device.

BACKGROUND

The Universal Mobile Telecommunications System (UMTS) is a $3^{rd}$ Generation (3G) mobile telecommunications system based on the Wideband Code Division Multiple Access (WCDMA) air interface technology, and is also known as a WCDMA communication system. The structure of a UMTS is similar to that of a $2^{nd}$ Generation (2G) mobile telecommunications system, and is composed of a UMTS Terrestrial Radio Access Network (UTRAN), a Core Network (CN), and User Equipment (UE).

As shown in FIG. 1, a UTRAN includes one or more Radio Network Subsystems (RNSs). An RNS includes a Radio Network Controller (RNC) and one or more base stations (Node Bs). The RNC is connected with the CN through an Iu interface, the Node B is connected with the RNC through an Iub interface, and the Node B is connected with the UE through a Uu interface. Within a UTRAN, the RNCs are interconnected through an Iur interface. The Iur interface provides connection through a direct physical connection between RNCs or a transport network. The RNC allocates and controls the radio resources of the Node B connected or related to the RNC. The Node B converts the data flows between an Iub interface and a Uu interface, and participates in radio resource management.

As shown in FIG. 2, an Iub interface protocol stack includes: a radio network control plane, a transport network control plane, and a user plane. The bearer layer involves two transmission modes: Asynchronous Transfer Mode (ATM) transmission, and Internet Protocol (IP) transmission. The voice and data of the UE are encapsulated in various Framing Protocol (FP) frames, and are transmitted at the Iub interface through the functions of the ATM or IP.

The transmission resources between the Node B and RNC are precious. Therefore, enhancing the transmission efficiency of the Iub interface and making the most of the transmission resources have been concerns of operators.

Currently, in order to save transmission resources, operators need to set a convergence device on the Iub interface link designed for converging transmission bandwidth. FIG. 3 shows the typical networking. Multiple Node B services are converged through a transmission convergence device, or converged through a hub Node B device. If multiple Node B services are converged through a hub Node B device, the hub Node B serves as a Node B, and is adapted to converge and concatenate Node B services. This networking mode is also called hub networking, and the convergence device is called a hub node. Multiple Node Bs are interconnected with the hub node. The Node B services are converged through the hub node and then connected to the RNC through an upstream port. After the services are converged through the hub node, the transmission bandwidth required between the hub node and RNC decreases drastically, and it is not necessary to plan the transmission bandwidth between the hub node and RNC according to the algebraic sum of the service bandwidths required for all Node Bs, thus decreasing the transmission expenses and increasing the revenues of the operators. For an IP RAN, the hub networking is characterized in that:

All the IP packets from the Node Bs (#1, #2, ..., #n) to the RNC have the same destination IP address; and all the IP packets from the RNC to all the Node Bs (#1, #2, ..., #n) have the same source IP address.

FIG. 4 shows a router-based or switch-based service convergence networking solution. The quantity of Node Bs converged by a router or switch depends on the actual networking conditions and the location of the router or switch. At the Node B access side, 10-15 Node Bs are generally converged.

However, in the process of implementing the present invention, the inventor finds that a great average overhead of user data flows still exists on the Iub interface currently. That is because voice services are generally a majority and small packets are a majority of the IP packets between the Node B and the RNC, especially, at the early stage of the 3G services. According to the protocol stack shown in FIG. 2, in the IP transmission mode, the efficiency of encapsulating small packets is very low, and the utilization ratio of the transmission bandwidth of small packets is very low. For example, for Adaptive Multi-Rate (AMR) 12.2 Kbps services, the size of an FP frame is about 40 bytes if the Transmission Timing Interval (TTI) of the frame is 20 ms. In the case that the voice packets to be transmitted are encapsulated through a User Datagram Protocol (UDP), an IP protocol or a Medium Access Control (MAC) protocol, the overhead for encapsulation on the transport layer includes an 8-byte UDP header, a 20-byte IP header (supposing that the IPv4 protocol is applied) and an 18-byte MAC header. If the overhead for encapsulation of a voice packet with a 40-byte payload is 46 bytes, the efficiency of the transport layer is less than 50%.

Although the efficiency may be enhanced through the technologies such as IP header compression, Point-to-Point Protocol (PPP) header compression, and PPP Multiplexing (PPPmux), the router is unable to identify the destination address in the packet header correctly after compression. Therefore, such technologies for enhancing efficiency are applicable only to the point-to-point networking scenarios, and not applicable to the network constructed through Iub interfaces from multiple points (multiple Node Bs) to a single point (a single RNC). A great average overhead of user data flows still exists on the Iub interface.

SUMMARY

The embodiments of the present invention aim to provide an uplink transmission method, a downlink transmission method and a convergence device.

A uplink transmission method is provided in an embodiment of the present invention. The uplink transmission method includes: selecting a user plane User Datagram Protocol (UDP) packet compliant with a multiplexing condition among the user plane UDP packets that come from at least one Node B; and multiplexing the user plane UDP packet compliant with the multiplexing condition to generate a multiplexed UDP packet, and sending the multiplexed UDP packet to a Radio Network Controller (RNC).

A downlink transmission method is provided in an embodiment of the present invention. The downlink transmission method includes: receiving a multiplexed UDP packet from the RNC, demultiplexing the UDP packet into at least two user plane UDP packets, and sending the packets to corresponding Node Bs or a corresponding Node B.

A system is provided in an embodiment of the present invention. The system includes a convergence device. The convergence device is adapted to receive user plane User Datagram Protocol, UDP, packets from one or more Node Bs, select user plane UDP packets compliant with a multiplexing condition among the received user plane UDP packets, and multiplex the selected UDP packets to generate a multiplexed UDP packet.

BRIEF DESCRIPTION OF THE DRAWINGS

FIG. 6 shows a format of a multiplexed UDP packet in one embodiment of the present invention;

DETAILED DESCRIPTION

In order to make the technical solution, objectives and merits of the present invention clearer, the embodiments of the present invention are described below in detail by reference to accompanying drawings.

Figure 1:
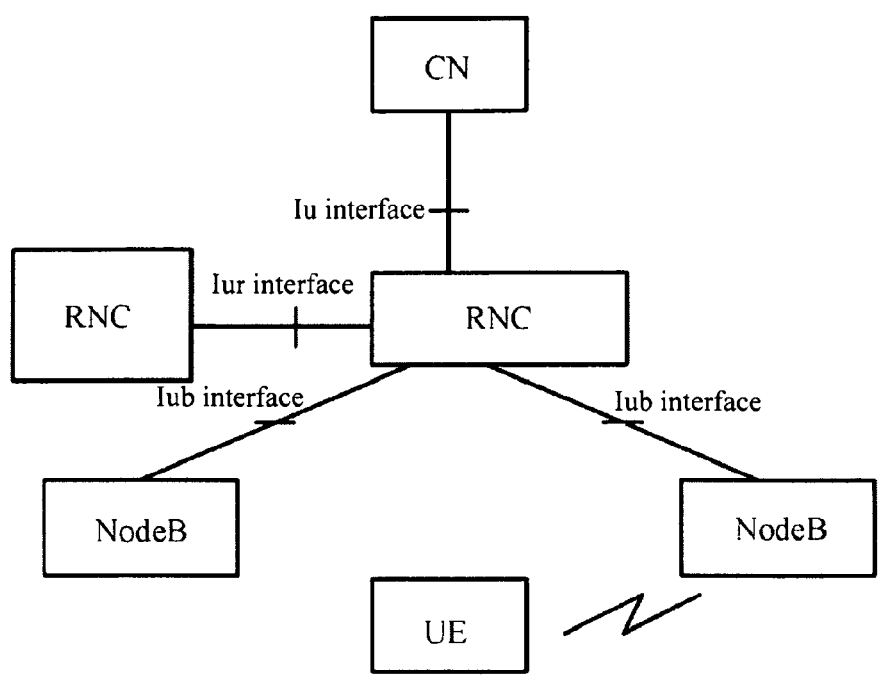
FIG. 1 shows a structure of a UTRAN network in the prior art.
Figure 2:
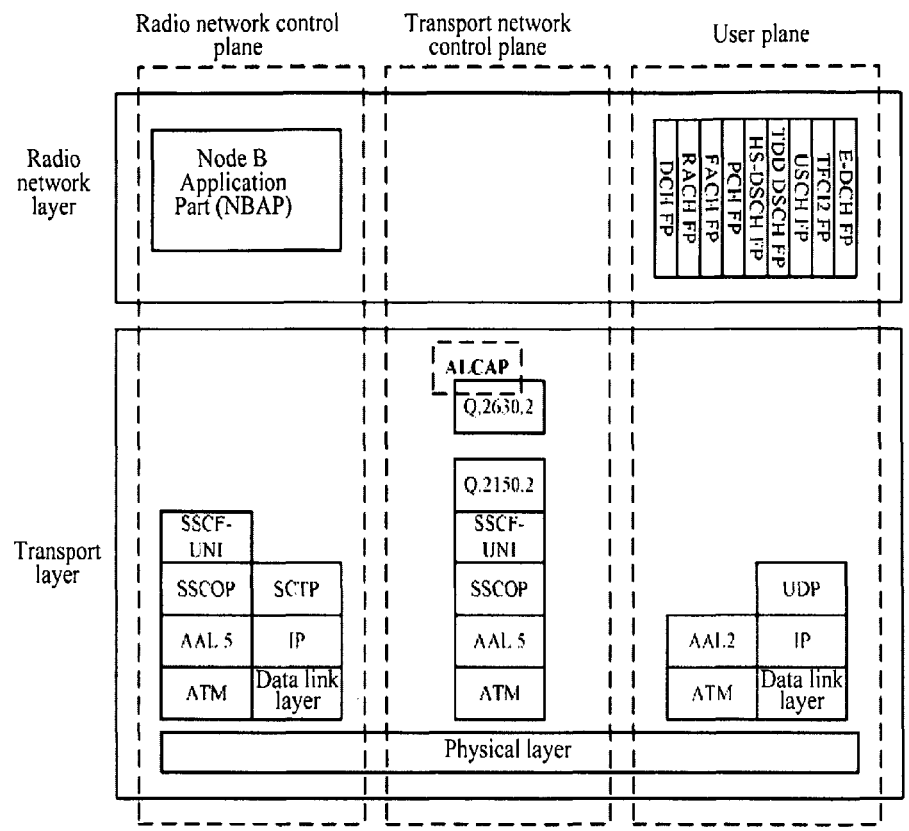
FIG. 2 shows a structure of an Iub interface protocol stack in the prior art.
Figure 3:
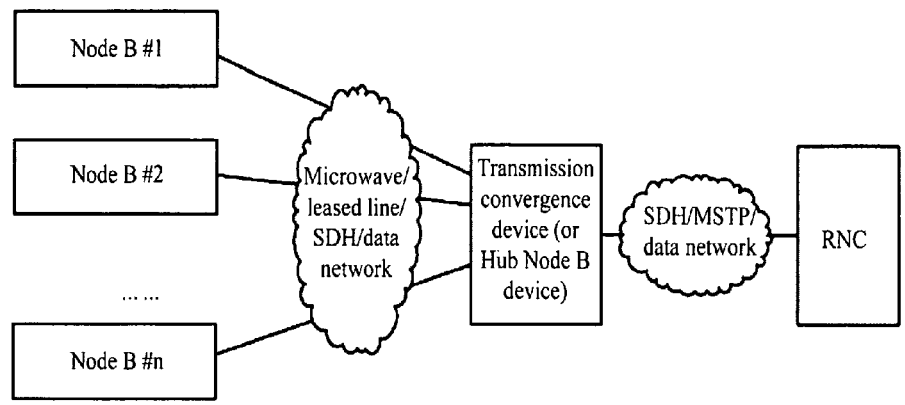
FIG. 3 shows typical hub networking in the prior art.
Figure 4:
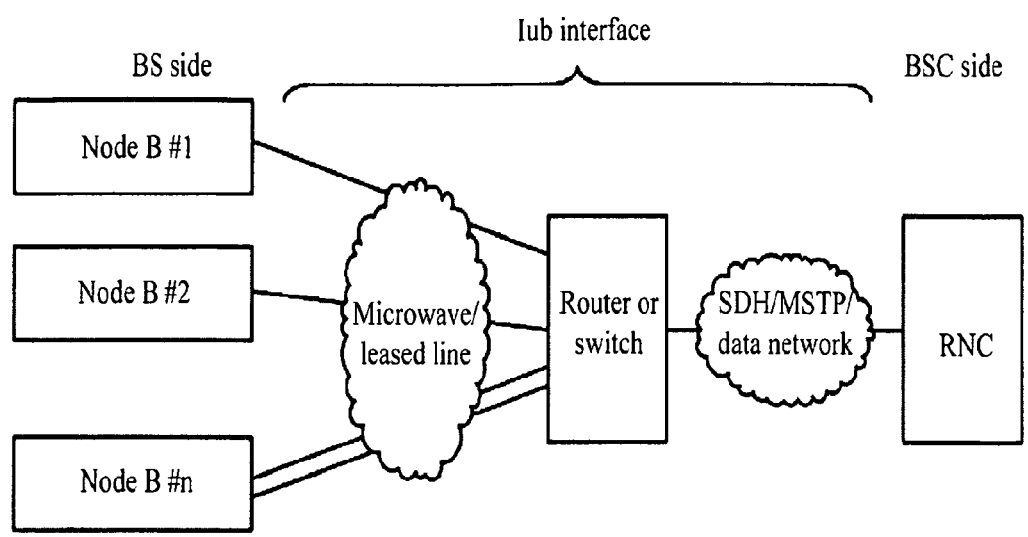
FIG. 4 shows service hub networking based on a router or switch in the prior art.
Figure 5:
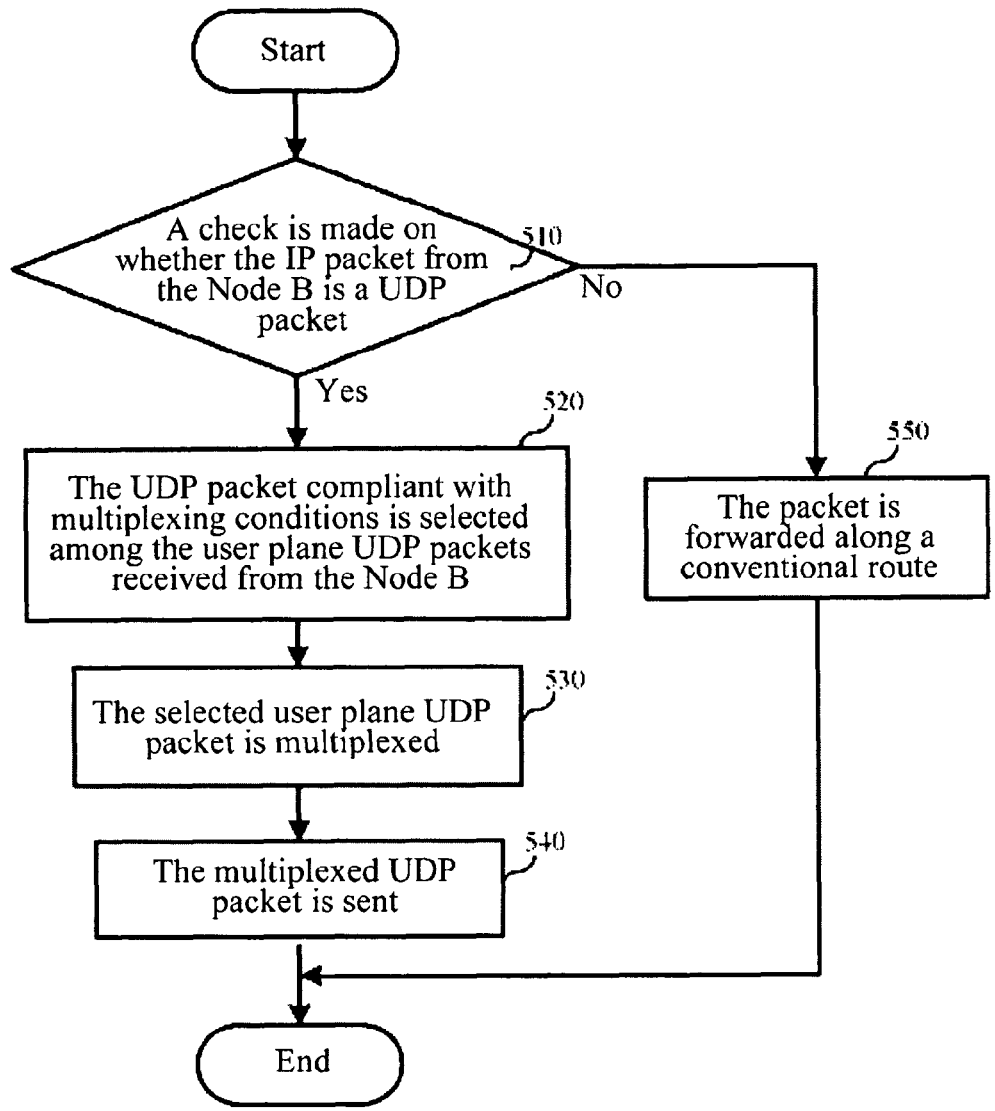
FIG. 5 shows how a hub device multiplexes a user plane UDP packet in the uplink transmission method according to one embodiment of the present invention.

One embodiment of the present invention relates to an uplink transmission method. In this embodiment, user plane UDP packets that come from multiple Node Bs and comply with a multiplexing condition are multiplexed together to generate multiplexed UDP packets, and the multiplexed UDP packets are sent to an RNC, as shown in FIG. 5.

510: A check is made on whether an IP packet from a Node B is a user plane UDP packet. If the IP packet from the Node B is a user plane UDP packet, the process proceeds to step 520. If the IP packet from the Node B is a non-UDP packet, the process proceeds to step 550, in which the non-UDP packet is forwarded along a conventional route.

520: The user plane UDP packets compliant with the multiplexing condition are selected out of the user plane UDP packets that come from different Node Bs.

Specifically, the services transmitted at the Iub interface range from the low-rate AMR 4.75 Kbps voice services to high-rate 2.048 Mbps data services. Therefore, the size of the payload FP Protocol Data Unit (PDU) of the user plane UDP packet varies. For example, the length of the FP PDU of a high-rate 384 Kbps data service is about 500 bytes, and little efficiency is enhanced if the packets are multiplexed through the prior art. In this step, not all user plane UDP packets are multiplexed. Instead, the user plane UDP packets compliant with the multiplexing condition are selected for multiplexing. In this way, the user plane UDP packets of high multiplexing efficiency may be selected for multiplexing, the multiplexing effect is improved, and the data transmission efficiency is enhanced on the whole.

The specific multiplexing condition may be one of the following items or any combination thereof:

(1) The payload FP PDUs of the user plane UDP packets for multiplexing are of the same priority.

(2) The length of the payload FP PDUs of the user plane UDP packets for multiplexing is less than a preset threshold which is configurable. With the length of the payload FP PDU serving as a multiplexing condition, the user plane UDP packets for multiplexing are ensured to be worthy of multiplexing, and the transmission efficiency is further improved.

(3) The length of the payload of the UDP packets generated after multiplexing is less than a preset threshold which is configurable. The length of the packet header of the UDP packets is fixed. Therefore, the multiplexing condition may also be: The length of the UDP packets generated after multiplexing is less than a preset threshold. By restricting the length of the multiplexed UDP packets, it is avoided that too many user plane UDP packets are multiplexed to a UDP packet sent to the RNC, and it is avoided that a long delay is generated due to multiplexing operations.

(4) The payload FP PDUs of the user plane UDP packets for multiplexing are of the same service type, for example, the R99/High Speed Packet Access (HSPA) service type or the voice/data service type.

The user plane UDP packets compliant with the multiplexing condition(s) are multiplexed so that the transmission efficiency of the user services is enhanced and the transmission resources are brought into full play.

530: The selected user plane UDP packets are multiplexed.

The payload of the UDP packet sent to the RNC after multiplexing includes the FP PDUs of multiple user plane UDP packets for multiplexing. Therefore, a multiplexing header needs to be set for each FP PDU. The multiplexing header carries a Node B identifier indicating the Node B from which the FP PDU comes, and carries a user identifier indicating the user of the Node B to whom the FP PDU belongs.

Specifically, FIG. 6 shows the format of a multiplexed UDP packet to be sent to the RNC. The UDP packet includes an IP header and a UDP header. The IP header is 20 bytes (IPv4) or 40 bytes (IPv6) in length, and is adapted to store the destination IP address and source IP address. The UDP header is eight bytes in length, and is adapted to store the destination UDP port number and source UDP port number. The payload of the UDP packet carries the FP PDU of each user plane UDP packet compliant with the multiplexing conditions and the multiplexing header of the FP PDU (FPmux header). Different FP PDUs are isolated through a multiplexing header.

Each multiplexing header may include three parts: Node B identifier (NID), which is 1 byte in length and adapted to identify the Node B from which the FP PDU comes, where the NID uniquely corresponds to the IP address of the Node B. Therefore, the corresponding NID may be obtained according to: the source IP address of the user plane UDP packet from the Node B; User Identifier (UID), which is 2 bytes in length and is adapted to identify the user in the Node B to whom the FP PDU belongs, where a maximum of 65535 users are identifiable; and Length Field, which is 1-2 bytes in length and adapted to indicate the length of the FP PDU. Therefore, the total length of the multiplexing header is 4-5 bytes.

The destination UDP port number in the user plane UDP packet may be used as UID. The 3GPP stipulates that a user data service flow is identified by the source IP, destination IP, source UDP port, and destination UDP port. In an Iub interface, the uplink user data flow is identified by an uplink user data flow identifier, and the downlink user data flow is identified by a downlink user data flow identifier. In the Iub interface, the destination port of the uplink user data flow is a UDP port allocated to the RNC, and this UDP port may be adapted to identify the uplink user data flow received at the RNC; the destination port of the downlink user data flow is a UDP port allocated to the Node B, and this UDP port may be adapted to identify the downlink user data flow received at the Node B. Therefore, the RNC and Node B can receive the user data flows of the corresponding UDP port and handle them correctly when data is sent to the UDP port allocated to the RNC or Node B. The uplink and downlink data flows of a user may be determined as long as a one-to-one corresponding relation is set up between the UDP port allocated to the RNC and the UDP port allocated to the Node B. Therefore, for a definite Node B, a user data service flow may be uniquely identified through a destination UDP port number. In this way, the user corresponding to the FP PDU may be uniquely identified at a low overhead, and the data transmission efficiency is further improved.

Figure 7:
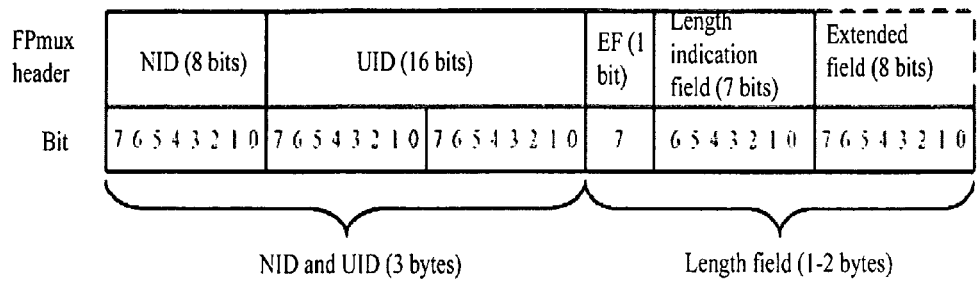
FIG. 7 shows a structure of a multiplexing header in one embodiment of the present invention.

As shown in FIG. 7, the structure of the multiplexing header includes: an NID, a UID, and a length field. The length field includes a 7-bit length indication field and a 1-bit Extension Flag (EF). If the value of the EF is 1 which indicates existence of an extension field, the multiplexing header also includes an extension field of a preset length (for example, 8 bits). That is, if the EF is equal to 1, it indicates that an extension field exists, and the extension field is 1 byte in length. In this case, the length field occupies 2 bytes. Conversely, if the EF is equal to 0, the multiplexing header includes no extension field, and the length field occupies 1 byte.

If the multiplexing header includes an extension field, the extension field may be used together with the length indication field to indicate the length of the FP PDU immediately after the multiplexing header, or a part of the extension field is used together with the length indication field to indicate the length of the FP PDU. For example, an 8-bit extension field is divided into two segments. 4 bits of the 8 bits are used together with 7 bits of the length indication field to indicate the FP PDU length, and the remaining 4 bits of the 8 bits may indicate one or more other information items. That is, if the length field occupies 1 byte (namely, no extension field exists), the maximum FP PDU length is 127 ($2^7-1$) bytes; if the length field occupies 2 bytes (namely, an extension field exists), the maximum FP PDU length is 2047 ($2^{11}-1$) bytes. The extension field may also indicate other information. An extension flag and an extension field are introduced into the multiplexing header. Therefore, the extension field is transmitted only if extension information needs to be carried, thus reducing the fixed overhead in the multiplexing header and improving flexibility of multiplexing.

It is worthy of attention that the format of the multiplexed UDP packet shown in FIG. 6 may vary. For example, all multiplexing headers may be concatenated together and placed at the forepart of the payload of the UDP packet; and all the FP PDUs are concatenated together and placed at the end of the payload of the UDP packet. The variations of the packet format may also fulfill the objectives of the present invention only if the reading sequence is modified at the receiver accordingly.

540: The multiplexed UDP packets are sent.

Specifically, a multiplexing flag may be set for the multiplexed UDP packet in this step. For example, the source UDP port number and/or the destination UDP port number in the packet header of the multiplexed UDP packet is set as a user-defined port, indicating to the receiver that the UDP packet is a multiplexed UDP packet. In this step, by using the particular source UDP port number and/or the destination UDP port number as a multiplexing flag of the UDP packets, an indication is made about whether the UDP packet is multiplexed without increasing any extra overhead, and the receiver can identify and analyze the multiplexed UDP packets and non-multiplexed UDP packets correctly.

Afterward, the UDP packet with a multiplexing flag is sent to the RNC. The destination IP address in the packet header of the multiplexed UDP packet is an IP address of the RNC, and the source IP address is the IP address of the hub device.

In this embodiment, the hub device selects user plane UDP packets compliant with multiplexing conditions among the user plane UDP packets that come from multiple Node Bs, multiplexes the selected user plane UDP packets, and sends the packets to the RNC. Therefore, the situation of increasing the packet overhead for each user plane UDP packet is avoided, the average overhead of user data flows at the Iub interface is reduced, the efficiency of transmission between the hub device and the RNC is enhanced, and the transmission bandwidth is saved. The UDP packets are IP-based so that the transmission method is applicable to both point-to-point link networking and route networking. The FP PDUs are multiplexed, without affecting the layers lower than the UDP. Therefore, no special requirement is imposed on the intermediate transmission devices between the RNC and the Node B. The intermediate transmission nodes may be used separately, or used together with other layer-3 or layer-2 efficiency enhancing technologies such as UDP/IP header compression, PPPmux and PPP header compression to accomplish higher transmission efficiency.

This embodiment supposes that the hub device selects user plane UDP packets compliant with multiplexing conditions among the user plane UDP packets that come from multiple Node Bs. In practice, the hub device may select user plane UDP packets compliant with multiplexing conditions among the user plane UDP packets that come from one Node B, which makes no essential difference as against this embodiment.

Figure 8:
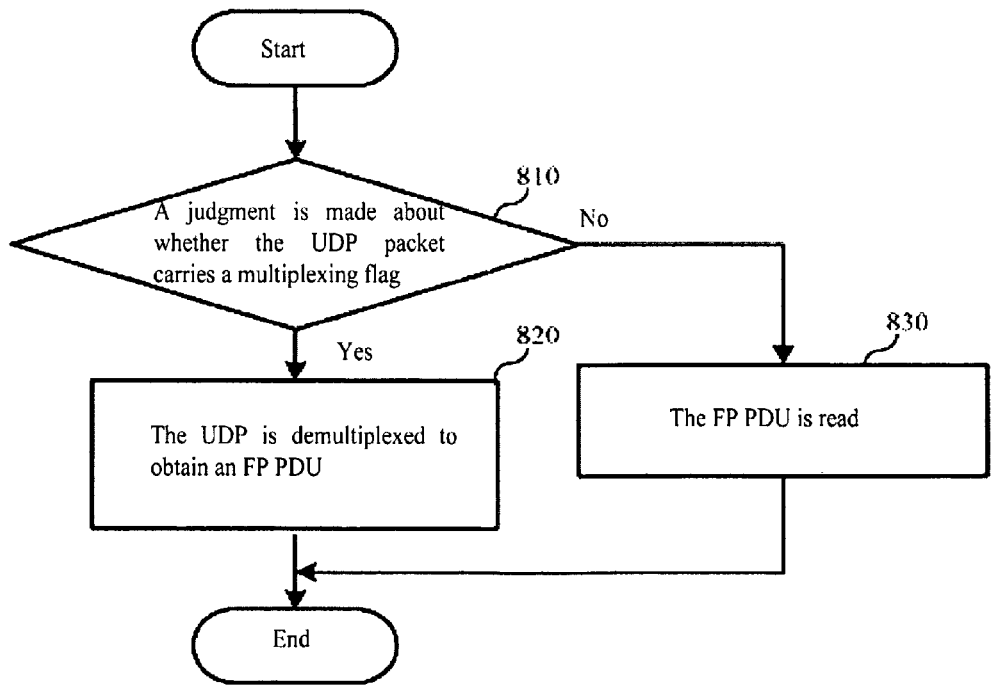
FIG. 8 shows how an RNC handles a received UDP packet in one embodiment of the present invention.

FIG. 8 shows how an RNC handles a UDP packet received from a hub device.

810: The RNC judges whether a multiplexing flag is set in the UDP packet received from the hub device (for example, whether the source UDP port and/or the destination UDP port in the packet header of the UDP packet is a user-defined port). If a multiplexing flag is set, the UDP packet is a multiplexed UDP packet, and the process proceeds to step 820. If no multiplexing flag is set, it indicates that the UDP packet is a non-multiplexed UDP packet, and the process proceeds to step 830, in which the FP PDU is read from the non-multiplexed UDP packet according to the prior art.

820: The receiver demultiplexes the payload of the UDP packet to obtain individual FP PDUs. Specifically, at least one FP PDU and its multiplexing header are included in the payload of a UDP packet, and each multiplexing header includes an NID, a UID and a length field. Therefore, the demultiplexing is performed in the following way:

The multiplexing header of an FP PDU is read from the payload of the UDP packet. According to the length field in the multiplexing header, the corresponding FP PDU is read from the payload of the UDP packet. According to the NID and UID in the multiplexing header, the Node B that accommodates the FP PDU and the user are determined. This step is repeated until all data in the payload of the UDP packet is processed.

The multiplexing header of each FP PDU includes an NID, a UID, an extension flag, a length indication field, and possibly an extension field. Therefore, at the time of reading the multiplexing header of the FP PDU, the basic part (namely, NID+UID+extension flag+length indication field) of the multiplexing header is read first. A judgment is made about whether an extension field exists according to the extension flag in the basic field. If an extension field exists, the extension field of the multiplexing header is read from the payload of the UDP packet; otherwise, no reading of the extension field is required.

Another embodiment of the present invention relates to an uplink transmission method. The embodiment is almost the same as the above-mentioned embodiment. The differences are: In the above-mentioned embodiment, the hub device selects the user plane UDP packets compliant with the multiplexing condition(s) directly after receiving the user plane UDP packets from each Node B; in this embodiment, the hub device judges whether the current network load is greater than a preset threshold, namely, whether the current network is light-loaded. If the current network load is greater than the preset threshold (namely, the current network is not light-loaded), the hub device selects the user plane UDP packets compliant with the multiplexing condition(s). If the current network load is less than or equal to the preset threshold (namely, the current network is light-loaded), the UDP packet is sent along a conventional route. That is, before step 510, a judgment is made about whether the current network is light-loaded. If the current network is not light-loaded, the process proceeds to step 510. In this way, the user plane UDP packets may avoid of being multiplexed futilely in the case that much transmission bandwidth is redundant, and unnecessary delay introduced by the futile multiplexing.

One embodiment of the present invention relates to a downlink transmission method. In the embodiment, if the hub device receives a multiplexed UDP packet from the RNC, the hub device demultiplexes the UDP packet into at least two user plane UDP packets, and sends the packets to the corresponding Node Bs respectively.

Specifically, the RNC selects the FP PDUs compliant with the multiplexing condition(s) among the FP PDUs that are ready to be sent to Node Bs and belong to users, and multiplexes the selected FP PDUs. FIG. 6 shows a format of a multiplexed UDP packet. A multiplexed UDP packet includes an IP header and a UDP header. The payload of the UDP packet carries each FP PDU compliant with the multiplexing conditions and the multiplexing header of the FP PDU. Different FP PDUs are isolated through a multiplexing header. FIG. 7 shows a structure of a multiplexing header. The multiplexing method is similar to the method of the hub device multiplexing the user plane UDP packets received from the Node B in the embodiment corresponding to FIG. 5 of the present invention, and is not repeated here any further. In the IP header, the destination IP address is the IP address of the hub device, and the source IP address is the IP address of the RNC.

Figure 9:
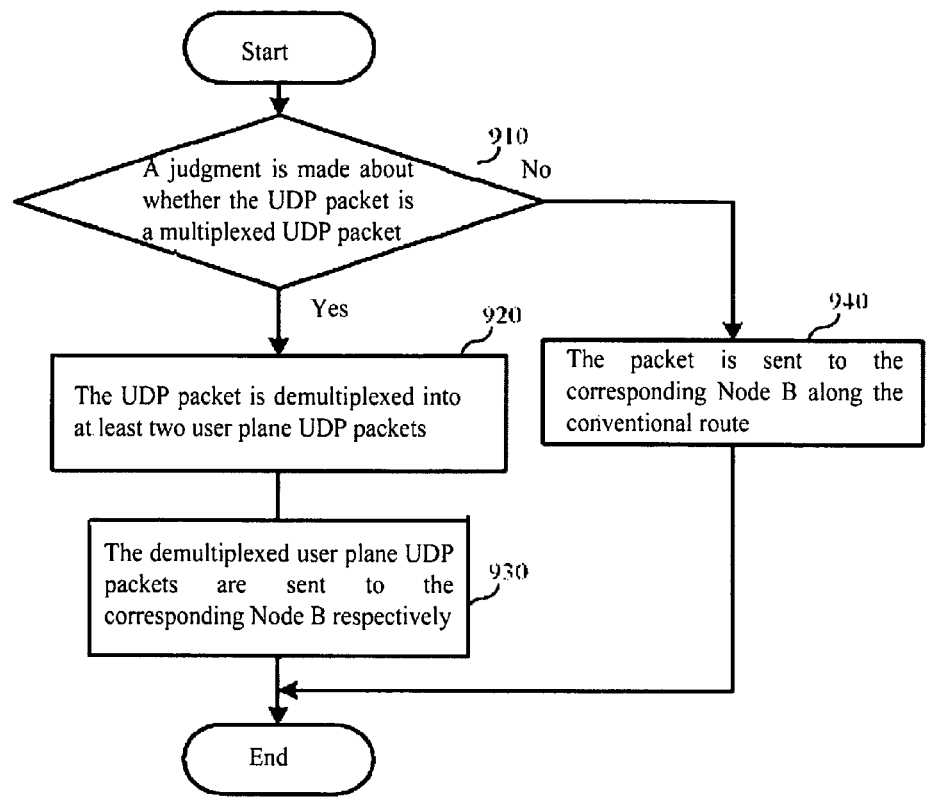
FIG. 9 shows how a hub device handles a received UDP packet in the downlink transmission method according to one embodiment of the present invention.

FIG. 9 shows how the hub device handles a UDP packet received from the RNC. First, the hub device needs to check whether the IP packet from the RNC is a UDP packet. If the IP packet is not a UDP packet, the IP packet is forwarded to the corresponding Node B along the conventional route; if the IP packet is determined to be a UDP packet, the process proceeds to step 910.

910: The hub device judges whether the received UDP packet is a multiplexed UDP packet. Specifically, the hub device judges whether a multiplexing flag is set in the UDP packet, for example, whether the source UDP port and/or the destination UDP port in the packet header of the UDP packet is a user-defined port. If a multiplexing flag is set, the UDP packet is a multiplexed UDP packet, and the process proceeds to step 920. If no multiplexing flag is set, it indicates that the UDP packet is a non-multiplexed UDP packet, and the process proceeds to step 940, in which the non-multiplexed UDP packet is sent to the corresponding Node B along the conventional route.

920: The hub device demultiplexes the multiplexed UDP packet into atleast two user plane UDP packets.

Specifically, at least one FP PDU and its multiplexing header are included in the payload of a multiplexed UDP packet, and each multiplexing header includes an NID, a UID and a length field. The length field includes an extension flag, a length indication field, and possibly an extension field. Therefore, the demultiplexing mode may be as follows:

The multiplexing header of an FP PDU is read from the payload of the multiplexed UDP packet. At the time of reading the multiplexing header of the FP PDU, the basic field (namely, NID+UID+extension flag+length indication field) of the multiplexing header is read first. A judgment is made about whether an extension field exists according to the extension flag in the basic field. If an extension field exists, the extension field of the multiplexing header is read from the payload of the UDP packet; otherwise, no reading of the extension field is required.

According to the result of reading the multiplexing header, the corresponding FP PDU is read from the payload of the UDP packet, and the readout FP PDU is filled into the payload of the user plane UDP packet. The NID in the multiplexing header is the identifier of the Node B to which the FP PDU belongs, and the UID in the multiplexing header is the identifier of the user to whom the FP PDU belongs. Therefore, the readout UID may be filled into the target UDP port in the UDP header of the user plane UDP packet. After the readout NID is converted to an IP address of the corresponding Node B, the IP address is filled into the IP header of the user plane UDP packet.

Through the foregoing operations, the multiplexed UDP packet is demultiplexed to obtain a user plane UDP packet. In this step, the foregoing operations need to be repeated until all data in the payload of the multiplexed UDP packet are processed. That is, all user plane UDP packets are obtained through demultiplexing of the multiplexed UDP packet.

930: The hub device sends the demultiplexed user plane UDP packets to the corresponding Node Bs respectively.

Figure 10:
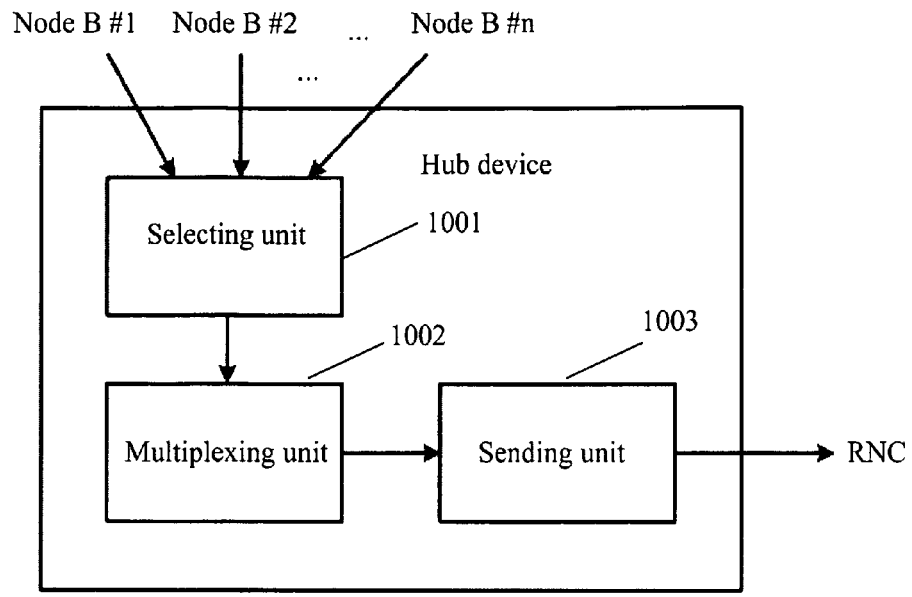
FIG. 10 shows a structure of a hub device in one embodiment of the present invention.

One embodiment of the present invention relates to a hub device. As shown in FIG. 10, the hub device includes:

a selecting unit 1001, adapted to select user plane UDP packets compliant with multiplexing conditions among the user plane UDP packets received from at least one Node B;

a multiplexing unit 1002, adapted to multiplex the user plane UDP packets selected by the selecting unit 1001 and to obtain a multiplexed UDP packet; and a sending unit 1003, adapted to send the multiplexed UDP packet to an RNC.

Through multiplexing of the user plane UDP packets, the situation of increasing the packet overhead for each user plane UDP packet is avoided, the average overhead of user data flows at the Iub interface is reduced, the efficiency of transmission between the hub device and the RNC is enhanced, and the transmission bandwidth is saved. The UDP packets are IP-based so that the transmission method is applicable to both point-to-point link networking and route networking.

The specific multiplexing conditions may be one of the following items or any combination thereof:

(1) The payload FP PDUs of the user plane UDP packet for multiplexing are of the same priority.

(2) The length of the payload FP PDUs of the user plane UDP packets for multiplexing is less than a preset threshold which is configurable. With the length of the payload FP PDU serving as a multiplexing condition, the user plane UDP packets for multiplexing are ensured to be worthy of multiplexing, and the transmission efficiency is further improved.

(3) The length of the payload of the UDP packet generated after multiplexing and sent to the RNC is less than a preset threshold which is configurable. The length of the packet header of the UDP packet is fixed. Therefore, the multiplexing condition may also be: The length of the UDP packet generated after multiplexing is less than a preset threshold. By restricting the length of the multiplexed UDP packet, it is avoided that too many user plane UDP packets are multiplexed to a UDP packet sent to the RNC, and it is avoided that a long delay is generated due to multiplexing operations.

(4) The payload FP PDUs of the user plane UDP packets for multiplexing are of the same service type, for example, the R99/High Speed Packet Access (HSPA) service type or the voice/data service type.

The FP PDUs compliant with the multiplexing conditions in the user plane UDPs instead of the FP PDUs in all user plane UDPs are multiplexed. Therefore, the FP PDUs of a higher multiplexing efficiency may be selected for multiplexing, thus improving the multiplexing effect and the data transmission efficiency on the whole.

The multiplexing unit 1002 includes:

an obtaining subunit, adapted to: obtain an NID for identifying Node Bs according to the IP address of the user plane UDP packet, and obtain UIDs for identifying different users in a Node B according to the information in the user plane UDP packet, where the UID may be a destination UDP port number in the packet header of the user plane UDP packet;

a filling subunit, adapted to fill the obtained NID and UID together with the payload FP PDU of the corresponding user plane UDP packet into the payload of a UDP packet to be sent to the RNC; and a control subunit, adapted to control the obtaining subunit and the filling subunit to handle at least two user plane UDP packets, namely, at least two user plane UDP packets are multiplexed into a UDP packet to be sent to the RNC.

The sending unit further includes a first subunit, adapted to set a multiplexing flag for the multiplexed UDP packet to be sent to the RNC.

Figure 11:
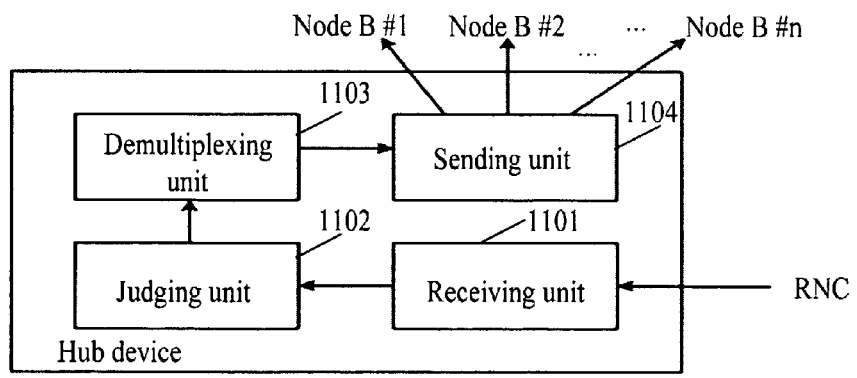
FIG. 11 shows a structure of a hub device in one embodiment of the present invention.

One embodiment of the present invention relates to a convergence device. The convergence device may be a hub device. As shown in FIG. 11, the hub device includes:

a receiving unit 1101, adapted to receive a UDP packet from the RNC;

a judging unit 1102, adapted to judge whether the received UDP packet is a multiplexed UDP packet;

a demultiplexing unit 1103, adapted to demultiplex the received multiplexed UDP packet into at least two user plane UDP packets; and a sending unit 1104, adapted to send the user plane UDP packets demultiplexed out by the demultiplexing unit to corresponding Node B(s) respectively.

The demultiplexing unit 1103 includes:

a reading subunit, adapted to read an FP PDU, an NID for identifying the Node B to which the FP PDU belongs, and a UID for identifying the user to whom the FP PDU belongs from the payload of the multiplexed UDP packet;

a filling subunit, adapted to: fill the FP PDU read by the reading subunit into the payload of the user plane UDP packet, fill the readout NID into the UDP header of the user plane UDP packet, and, after converting the readout Node B identifier to the IP address of the corresponding Node B, fill the IP address into the IP header of the user plane UDP packet; and a control subunit, adapted to instruct the reading subunit to perform reading and instruct the filling subunit to perform filling cyclically when handling a multiplexed UDP packet until completion of handling all data in the payload of the multiplexed UDP packet.

To sum up, in the embodiments of the present invention, the hub device selects the user plane UDP packets compliant with multiplexing conditions among the user plane UDP packets received from at least one Node B, multiplexes the selected user plane UDP packets, and sends the packets to the RNC. Therefore, the situation of increasing the packet overhead for each user plane UDP packet is avoided, the average overhead of user data flows at the Iub interface is reduced, the efficiency of transmission between the hub device and the RNC is enhanced, and the transmission bandwidth is saved. The UDP packet sent by the RNC to the hub device may also be a multiplexed UDP packet. After receiving the multiplexed UDP packet from the RNC, the hub device demultiplexes the UDP packet into at least two user plane UDP packets, and sends them to the corresponding Node Bs respectively, thus further reducing the average overhead of user data flows at the Iub interface, enhancing the efficiency of transmission between the hub device and the RNC and saving the transmission bandwidth. The UDP packets are IP-based so that the transmission method is applicable to both point-to-point link networking and route networking.

Moreover, the FP PDUs compliant with the multiplexing conditions in the user plane UDPs instead of the FP PDUs in all user plane UDPs are multiplexed. Therefore, the FP PDUs of a higher multiplexing efficiency may be selected for multiplexing, thus improving the multiplexing effect and the data transmission efficiency on the whole. For example, smaller FP PDUs may be selected for multiplexing, and larger FP PDUs are still transmitted in the existing transmission mode, thus enhancing the transmission efficiency of the low-rate user services effectively and making the most of the transmission resources. The FP PDU is multiplexed, without affecting the layers lower than the UDP. Therefore, no special requirement is imposed on the intermediate transmission node between the RNC and the Node B. That is, the intermediate transmission device may be used separately, or used together with other layer-3 or layer-2 efficiency enhancing technologies such as UDP/IP header compression, PPPmux and PPP header compression to accomplish higher transmission efficiency.

An NID (namely, Node B identifier) for identifying the Node B and a UID (namely, user identifier) for identifying different users in a Node B are obtained according to information in the user plane UDP packet. The obtained NID and UID together with the payload FP PDU of the user plane UDP packet into the payload of the UDP packet to be sent to the RNC, thus ensuring the RNC that serves as a receiver to identify the Node B to which each FP PDU in the UDP packet belongs and identify the users in the Node B correctly.

The destination UDP port number in the packet header of the user plane UDP packet is used as a UID. Therefore, the user to whom the FP PDU in the user plane UDP packet belongs is identified uniquely at a low overhead, and the data transmission efficiency is further improved.

A multiplexing flag is set for the multiplexed UDP packet to be sent to the RNC, and a specific source UDP port number and/or a destination UDP port number is used as a multiplexing flag of the UDP packet. Therefore, an indication may be made about whether the UDP packet is multiplexed without increasing the overhead, and the receiver can identify and resolve the multiplexed or non-multiplexed UDP packets correctly.

The multiplexing conditions are flexibly configurable. For example, the multiplexing condition is: The payload FP PDUs of the user plane UDP packets for multiplexing are of the same priority; or, the length of the payload FP PDUs of the user plane UDP packets for multiplexing is less than a preset threshold, with a view to further improving the multiplexing efficiency.

Before the user plane UDP packet is multiplexed, a judgment is made about whether the current network is light-loaded, and the user plane UDP packet is multiplexed only if the current network is light-loaded. In this way, the user plane UDP packets may avoid of being multiplexed futilely in the case that much transmission bandwidth is redundant, and unnecessary delay introduced by the futile multiplexing.

One embodiment of the present invention relates to a system. The system comprises a convergence device and the convergence device is adapted to receive user plane User Datagram Protocol, UDP, packets from one or more Node Bs, select user plane UDP packets compliant with a multiplexing condition among the received user plane UDP packets, and multiplex the selected UDP packets to generate a multiplexed UDP packet.

Moreover, the convergence device may be further adapted to receive a multiplexed UDP packet from a Radio Network Controller, RNC, and demultiplexes the received multiplexed UDP packet into at least two user plane UDP packets.

In addition, the system may further comprise a Radio Network Controller, RNC. The RNC is adapted to receive a multiplexed UDP packet from the convergence device, and demultiplex payload of the received multiplexed UDP packet to obtain individual Framing Protocol, FP, Protocol Data Unit, PDUs.

Although the invention has been described through some preferred embodiments and accompanying drawings, the invention is not limited to such embodiments. It is apparent that those skilled in the art can make various modifications and variations to the invention without departing from the spirit and scope of the invention.

What is claimed is:

1. An uplink transmission method, comprising:
    receiving, from at least two Node Bs, a plurality of user plane User Datagram Protocol (UDP) packets;
    selecting at least two packets from the plurality of UDP packets, the at least two packets including packets coming from different Node Bs, and the at least two packets being compliant with a multiplexing condition;
    multiplexing the at least two packets to generate a multiplexed packet; and
    sending the multiplexed packet to a Radio Network Controller (RNC),
    wherein the multiplexing comprises:
        obtaining a first Node B identifier, the first Node B identifier being used for identifying a first Node B of the at least two Node Bs, and the first Node B corresponding to a first packet of the at least two packets;
        obtaining a first user identifier, the first user identifier being used for identifying a first user, and the first user corresponding to the first packet; and
        filling the first Node B identifier and the first user identifier to ether with a Framin Protocol (FP) Protocol Data Unit (PDU) for the first packet into the multiplexed packet.

2. The method of claim 1, wherein the first user identifier is obtained according to a destination UDP port number in the first packet.

3. The method of claim 1, wherein the filling comprises:
    setting a multiplexing header for the FP PDU, the multiplexing header comprising the first Node B identifier, the first user identifier, a length indication field for indicating the length of the FP PDU, and an extension flag for indicating existence of an extension field; and
    filling the multiplexing header and the FP PDU into the multiplexed packet.

4. The method of claim 1, wherein the sending comprises:
    setting a multiplexing flag for the multiplexed packet; and
    sending the multiplexed packet with the multiplexing flag to the RNC.

5. The method of claim 4, wherein the setting comprises:
    setting at least one of the following ports to a predetermined value: a source UDP port of the multiplexed packet, and a destination UDP port of the multiplexed packet.

6. The method of claim 1, wherein the multiplexing condition comprises any of the following or any combination thereof:
    FP PDUs of the at least two packets are of the same priority;
    a length of each FP PDU for each of the at least two packets is less than a preset threshold;
    a length of the multiplexed packet is less than a preset threshold; and
    FP PDUs of the at least two packets are of the same service type.

7. The method of claim 1, wherein the first Node B identifier is obtained according to a source IP address of the first packet.

8. The method of claim 1, wherein the at least two packets including packets coming from different users.

9. The method of claim 1, wherein the multiplexing further comprises:
    obtaining a second Node B identifier, the second Node B identifier being used for identifying a second Node B of the at least two Node Bs, and the second Node B corresponding to a second packet of the at least two packets;
    obtaining a second user identifier, the second user identifier being used for identifying a second user, and the second user corresponding to the second packet; and
    filling the second Node B identifier and the second user identifier together with a Framing Protocol (FP) Protocol Data Unit (PDU) for the second packet into the multiplexed packet.

10. The method of claim 9, wherein the second user identifier is obtained according to a destination UDP port number in the second packet.

11. A system, comprising:
    a convergence device being configured to:
        receive, from at least two Node Bs, a plurality of user plane User Datagram Protocol (UDP) packets;
        select at least two packets from the plurality of UDP packets, the at least two packets including packets coming from different Node Bs, and the at least two packets being compliant with a multiplexing condition;

multiplex the at least two packets to generate a multiplexed packet; and sending the multiplexed packet to a Radio Network Controller (RNC), wherein the multiplexed packet comprises a first Node B identifier, a first user identifier and a Framing Protocol (FP) Protocol Data Unit (PDU), the first Node B identifier being used for identifying a first Node B of the at least two Node Bs, the first Node B corresponding to a first packet of the at least two packets, the first user identifier being used for identifying a first user, and the first user corresponding to the first packet.

12. The system of claim 11, wherein the first user identifier is obtained according to a destination UDP port number of the first packet.

13. The system of claim 11, wherein the first Node B identifier is obtained according to a source IP address of the first packet.

14. The system of claim 11, wherein the multiplexed packet further comprises a length indication field for indicating the length of the FP PDU, and an extension flag for indicating existence of an extension field.

15. The system of claim 11, wherein the multiplexed packet comprises a multiplexing flag.

16. The system of claim 11, wherein the multiplexing condition comprises any of the following or any combination thereof:
- FP PDUs of the at least two packets are of the same priority;
- a length of each FP PDU for each of the at least two packets is less than a preset threshold;
- a length of the multiplexed packet is less than a preset threshold; and
- FP PDUs of the at least two packets are of the same service type.

17. A convergence device, comprising:
a memory retaining instructions related to:
selecting at least two packets from a plurality of user plane User Datagram Protocol (UDP) packets received from at least two Node Bs, the at least two packets including packets coming from different Node Bs, and the at least two packets being compliant with a multiplexing condition;
multiplexing the at least two packets to generate a multiplexed packet; and
sending the multiplexed packet to a Radio Network Controller (RNC); and
a processor, coupled to the memory, configured to execute the instructions retained in the memory,
wherein the multiplexing comprises:
obtaining a first Node B Identifier (NID) and a first User Identifier (UID), the first NID being used for identifying a first Node B of the at least two Node Bs, the first Node B corresponding to a first packet of the at least two packets, the first UID being used for identifying a first user, and the first user corresponding to the first packet;
filling the first NID and the first UID together with a Framing Protocol (FP) Protocol Data Unit (PDU) for the first packet into the multiplexed packet.

18. The convergence device of claim 17, wherein the sending comprises:
setting a multiplexing flag for the multiplexed packet.

19. The convergence device of claim 17, wherein the multiplexing condition comprises any of the following or any combination thereof:
- FP PDUs of the at least two packets are of the same priority;
- a length of each FP PDU for each of the at least two packets is less than a preset threshold;
- a length of the multiplexed packet is less than the preset threshold; and
- FP PDUs of the at least two packets are of the same service type.

* * * * *

UNITED STATES PATENT AND TRADEMARK OFFICE
CERTIFICATE OF CORRECTION

PATENT NO. : 9,078,290 B2  
APPLICATION NO. : 12/467096  
DATED : July 7, 2015  
INVENTOR(S) : Zhichang Lai Page 1 of 1

It is certified that error appears in the above-identified patent and that said Letters Patent is hereby corrected as shown below:

In the Claims

Claim 1, Column 12, Line 7: Delete "Framin" and insert --Framing--, therefor.

Signed and Sealed this
Thirteenth Day of October, 2015

Michelle K. Lee
*Director of the United States Patent and Trademark Office*